Patented July 27, 1954

2,684,950

UNITED STATES PATENT OFFICE 2,684,950

SULFURIC ACID GELS

Joseph T. Rivers, West Chester, Pa., and August H. Frazer, Wilmington, Del., assignors to E. I. du Pont de Nemours & Company, Wilmington, Del., a corporation of Delaware No Drawing. Application November 1, 1952, Serial No. 318,333

4 Claims. (Cl. 252—317)

This invention relates to sulfuric acid gels and more particularly to sulfuric acid which has been thickened by the addition of an inert, stable organic polyolefinic sulfone which is soluble in the sulfuric acid.

Heretofore, many inorganic liquids or dissolved salts have been thickened by gelling agents for particular uses, but as far as is known, no thickening agent has been proposed which is operative with concentrated sulfuric acid. This is primarily due to the fact that it is a powerful dehydrating agent and chars most organic compounds. Inorganic materials, on the other hand, are not charred but the sulfuric acid dehydrates them and thereby renders them ineffective, since usually the presence of water is necessary for gelling.

It is therefore an object of the present invention to provide a composition containing concentrated sulfuric acid with a relatively small percentage of inert thickening agent. Another object of the present invention is to thicken concentrated sulfuric acid with an agent soluble in the sulfuric acid which does not affect its chemical properties. A still further object is the use of the thickened concentrated sulfuric acid for a great many varied applications more fully described hereinafter. Other objects will appear as the description of the invention proceeds.

These and other objects are accomplished by incorporating from about 2 to 5% of polypropylene sulfone or its equivalent in concentrated sulfuric acid. By the term "concentrated" is meant a 66° Bé. or stronger acid i. e. at least 93% $H_2SO_4$. There is no limit to the upper concentration of sulfuric acid, and oleum or fuming sulfuric acid may be used. The compositions have a viscosity of about 300 poises at the lower concentrations up to about 5,000 for the stiff gels.

The polypropylene sulfone should be of a high molecular weight, since the thickening power varies largely with its molecular weight. A convenient means of estimating the molecular weight is by determining the intrinsic viscosity of the polymer. A value of $[\eta]=3.5$ is preferred although polymers having a $[\eta]$ value of 1 to 4 are operable in the invention. It has also been found that the higher the molecular weight, the smaller the percentage of polypropylene sulfone is necessary to produce a given degree of gelling.

Any polyolefinic sulfone may be used, provided it is at least partially soluble in sulfuric acid. Polyethylene sulfone is not soluble, and therefore does not operate satisfactorily. Polybutene sulfone is relatively soluble and is operative, but larger percentages are required to produce gelling. The higher olefin sulfones have increased solubilities in sulfuric acid, and likewise are not preferred.

The polypopylene sulfone may be made by any known method such as by reacting equal parts of liquid $SO_2$ and propylene in the presence of a suitable catalyst.

In the preferred embodiment of the invention the polypropylene sulfone should contain an average of one $SO_2$ group per propylene unit.

The following examples are given by way of illustration, although no limitation is intended thereon, since many modifications and substitutions may be made within the scope and spirit of the invention.

Example I

Polypropylene sulfone of high molecular weight having an intrinsic viscosity of approximately $[\eta]=3.5$ was ground until a finely-divided powder was obtained. 3.5 grams of this powder were dissolved in 96.5 parts of 98% sulfuric acid in a vessel provided with a stirrer and provided with cooling means to maintain the temperature at about 20° C. In a short time the polypropylene sulfone dissolved in the concentrated sulfuric acid to form a stable viscous solution having a viscosity of 842 poises by the falling ball method at room temperature.

Example II 4.5 parts of polypropylene sulfone having a molecular weight of $[\eta]=4$ in a finely-divided condition was stirred into 98% sulfuric acid maintained at room temperature during the stirring. The sulfuric acid gelled readily and yielded a stiff, viscous gel having a viscosity of 4170 poises by the falling ball method at room temperature. A similar experiment was carried out using 1.5 parts of polypropylene sulfone and 98.5 parts of concentrated sulfuric acid, but the resulting solution had a falling ball viscosity of only 270 poises which is insufficient for most purposes of the invention.

Example III

Polypropylene sulfone having a molecular weight of about $[\eta]=1$ was ground to a finely-divided powder. 5 grams of this powder was stirred into 95 parts of 70% oleum and maintained at room temperature by cooling until a thick stiff homogenous gel was obtained having light gray color with no signs of carbonization.

It will be apparent from the examples that any strength of concentrated sulfuric acid may be thickened to a consistency resembling that of an oil or paint to one of a jelly depending on the concentration of the polypropylene sulfone and the molecular weight of the sulfone. The strength of the sulfuric acid does not have a great effect on the viscosity of the thickened solution.

The advantages of the present invention will be readily apparent since the thickened sulfuric acid is applicable to many of the uses of unthickened acid and in addition the product of the present invention has many uses and advantages over commercial acid. One such advantage is that the concentrated sulfuric acid may be shipped and poured with a minimum of spillage and spattering.

The thickened acid is particularly useful for applying in certain designated areas such as by painting lines or letters on metal to etch its surface only where applied. These uses may be accomplished by off-set or intaglio printing using a suitable acid resisting roll such as one made from an inert polymer or a steel roll having a surface layer of tantalum or similar acid resisting metal. The product of the present invention is also useful in pickling metals.

It has further been found that when a solution of polypropylene sulfone in sulfuric acid is poured into water some of the polymer precipitates at the interface between the phases thereby forming a membrane impermeable to water but permeable to sulfuric acid. The sulfuric acid then migrates into the aqueous phase at a rate which may be controlled by the surface area of the precipitated polymer at the interface. This method is valuable for maintaining a large reservoir of acid which acidifies the water in a gradual and controlled manner dependant on the factors mentioned above and also on the size of the individual gel globules.

Another use of the product of this invention involving the permeability of the sulfuric acid through the precipitated polymer concerns the use of copper sulfate as an algaecide for cleaning lakes and ponds. Normally its high solubility causes it to be dissipated rapidly and frequent small applications are usually necessary. If copper sulfate is powdered and mixed with a polypropylene sulfone/sulfuric acid gel and the gel is poured into water, each particle of the salt is protected from rapid solution by a membrane of polymer. The water outside of the produced globules does not turn blue rapidly until a neutralizing agent such as a dilute base is added. Many other uses can be listed which will be obvious to those skilled in the art such as those pertaining to dyeing, fertilizers, petroleum purification, storage batteries, chemical syntheses such as sulfonations, and similar related uses.

It will be apparent that many widely different embodiments of this invention may be made without departing from the spirit and scope thereof, and therefore it is not intended to be limited except as indicated in the appended claims.

We claim:

1. A composition of matter having a gel-like consistency comprising essentially from 2 to 5% of polypropylene sulfone and from 95 to 98% of concentrated sulfuric acid, the said composition having a viscosity of from about 300 to 5,000 poises.

2. The composition of claim 1 in which the intrinsic viscosity of the polypropylene sulfone is about $[\eta]=1-4$.

3. The composition of claim 1 in which the intrinsic viscosity of the polypropylene sulfone is about $[\eta]=3.5$.

4. The composition of claim 1 in which the strength of the sulfuric acid is at least 93% $H_2SO_4$.

References Cited in the file of this patent

UNITED STATES PATENTS

| Number | Name | Date |
|---|---|---|
| 2,596,046 | Roth | May 6, 1952 |